W. A. LORENZ.
SLICING MACHINE.
APPLICATION FILED FEB. 14, 1907.
1,049,245.
Patented Dec. 31, 1912.
7 SHEETS—SHEET 1.
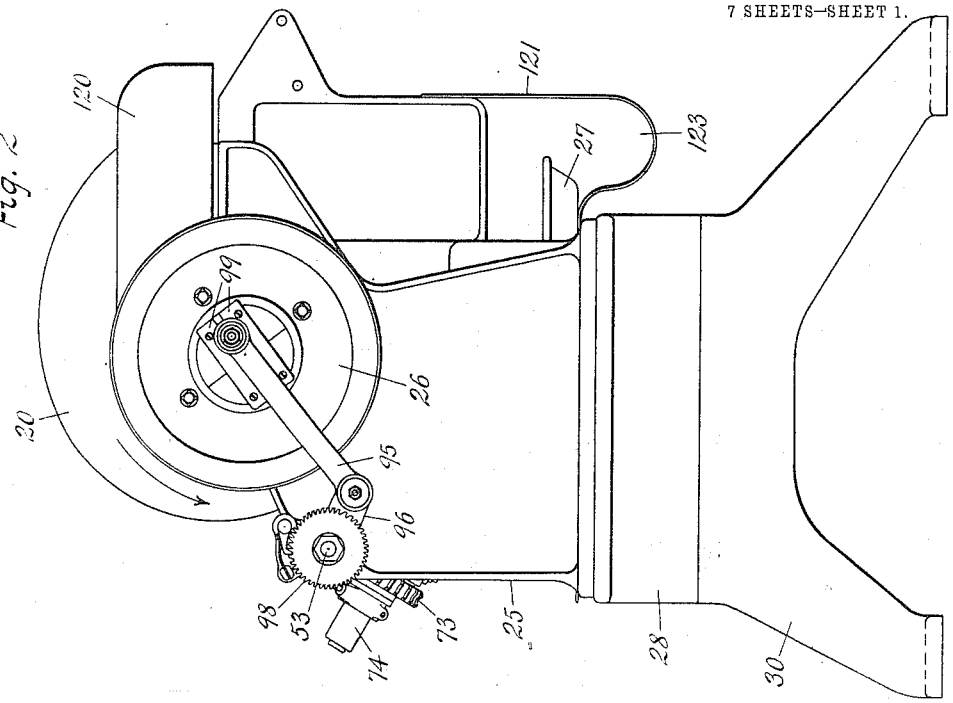
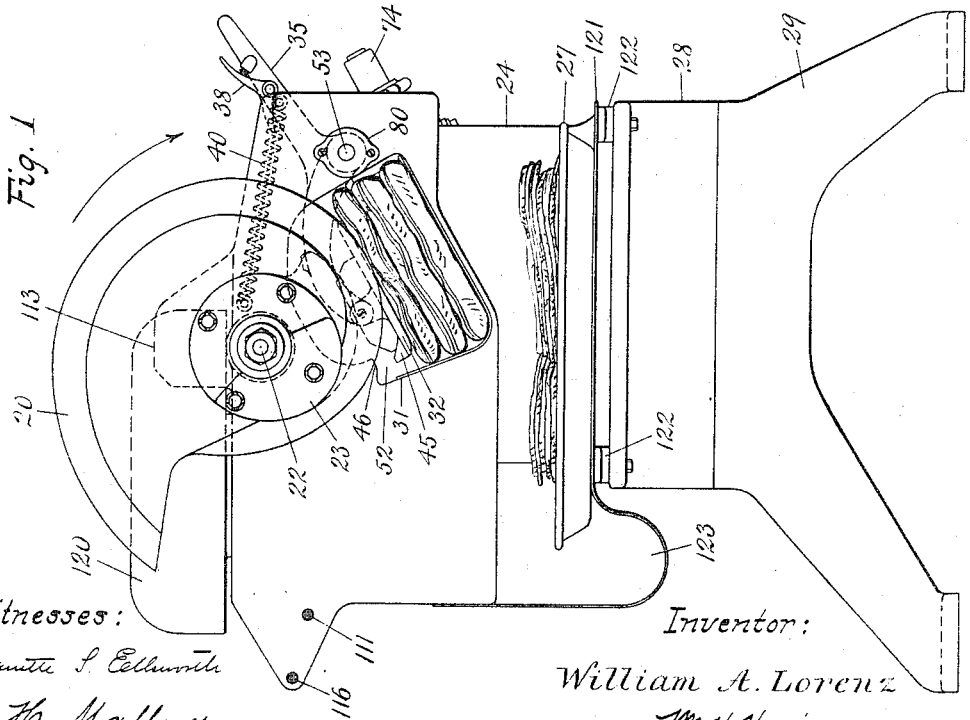
Witnesses:
Inventor:
William A. Lorenz

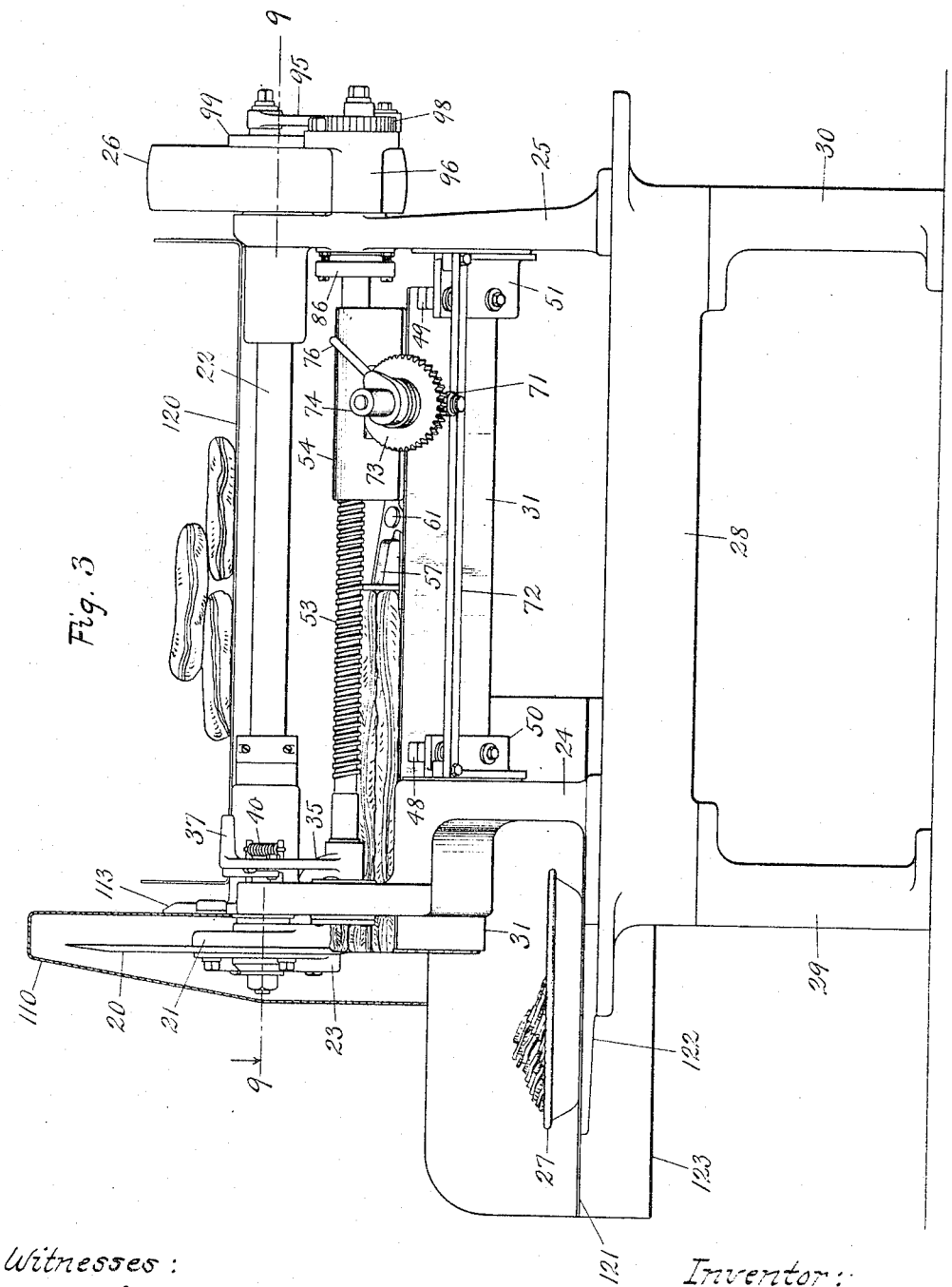

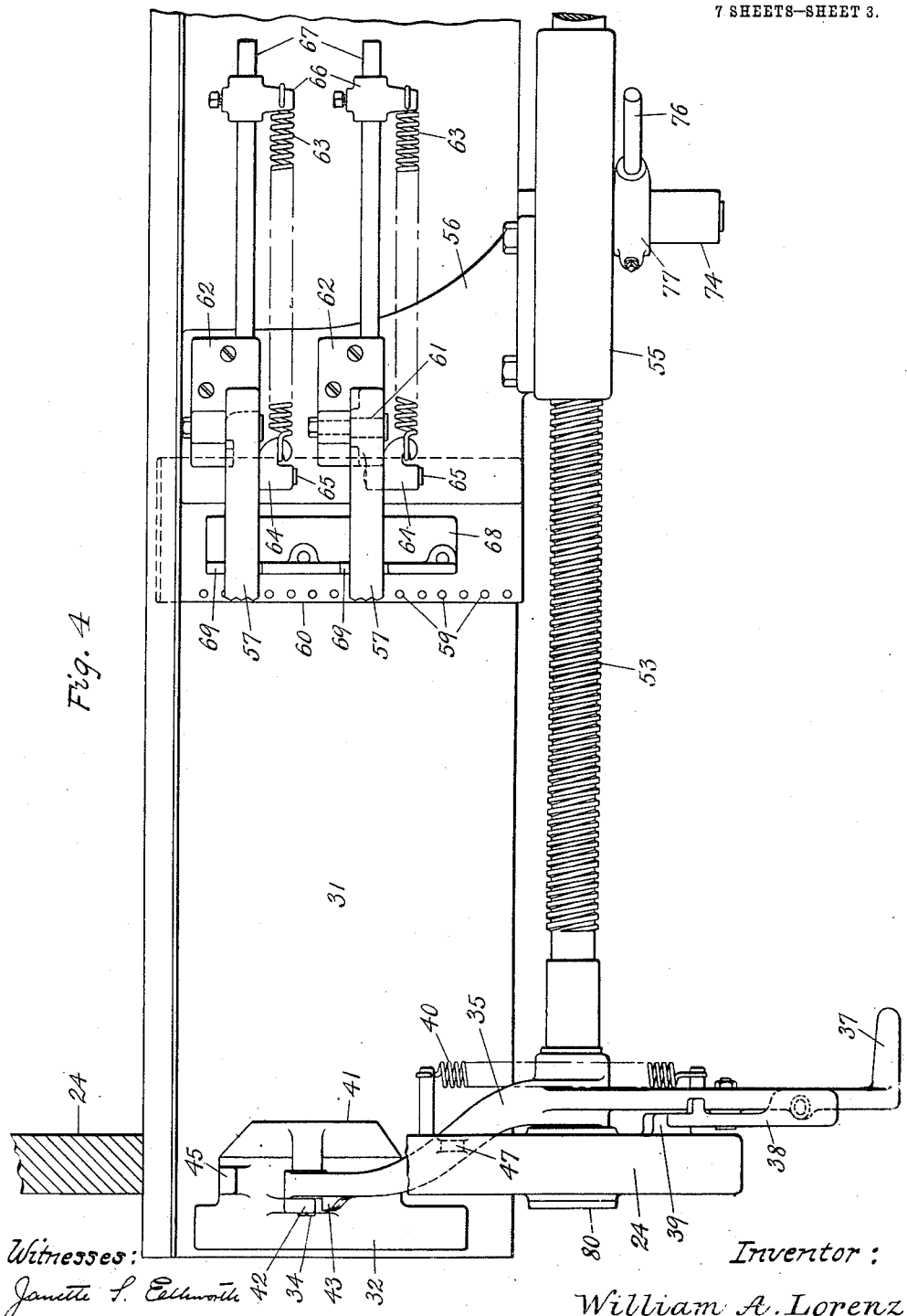

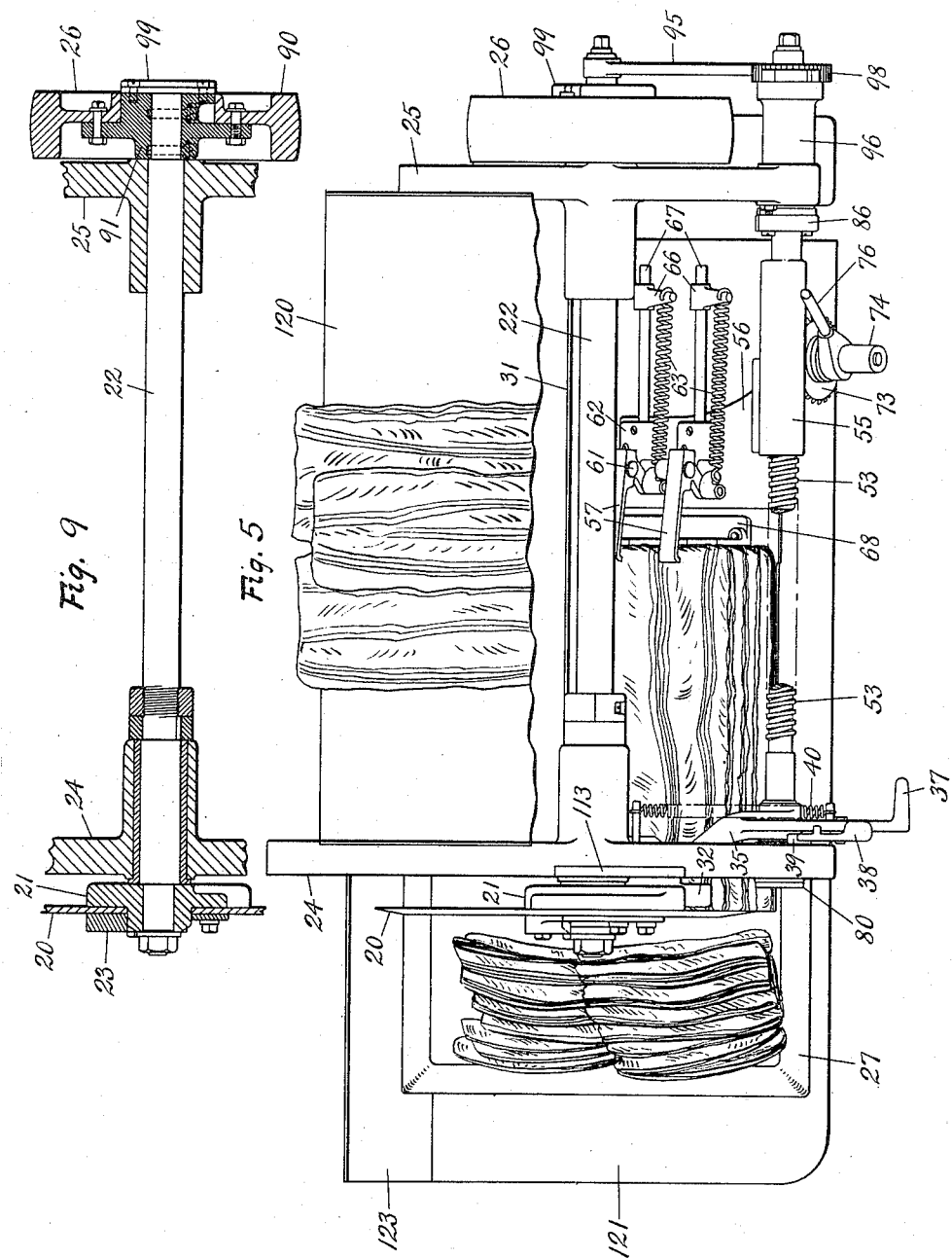

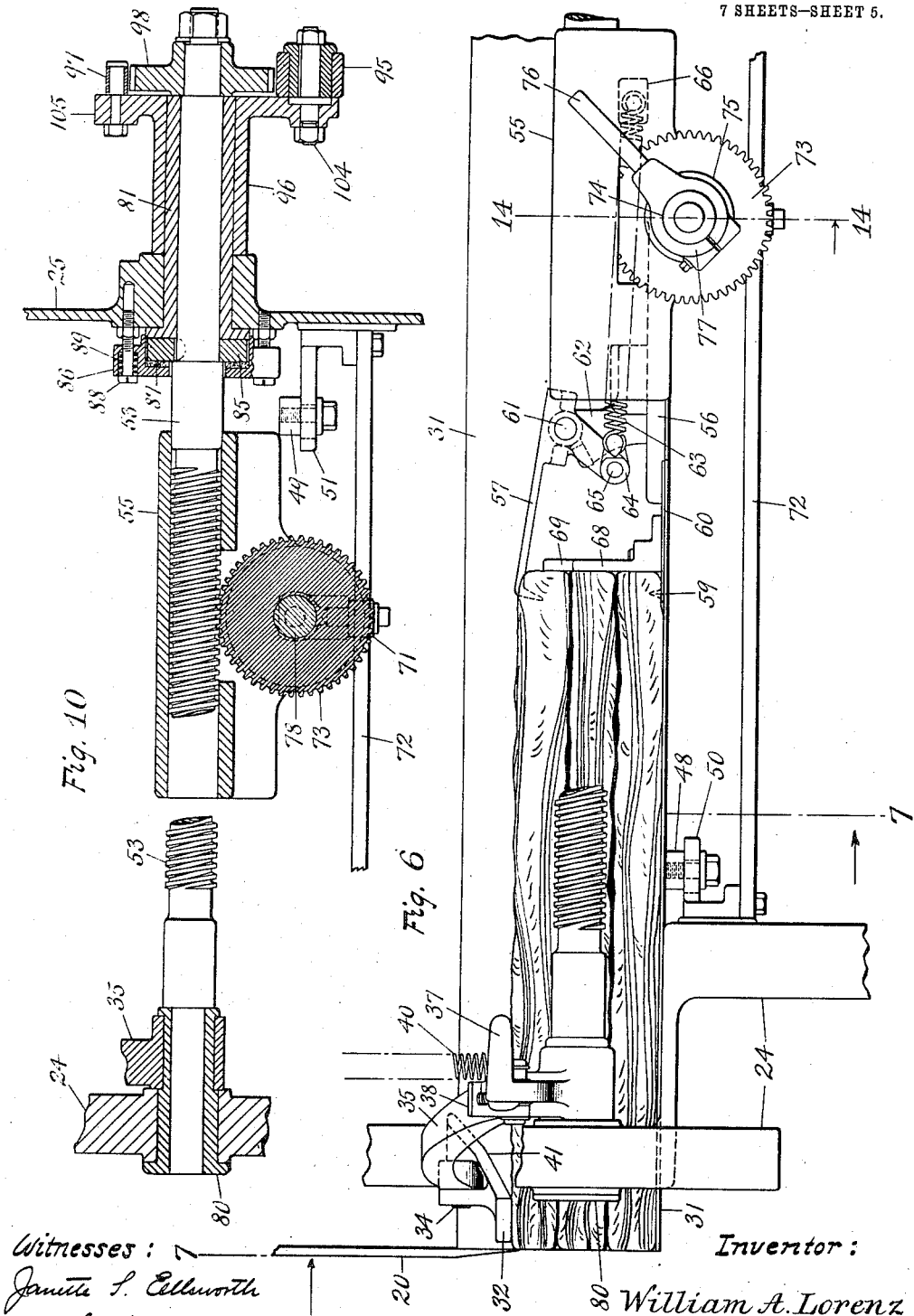

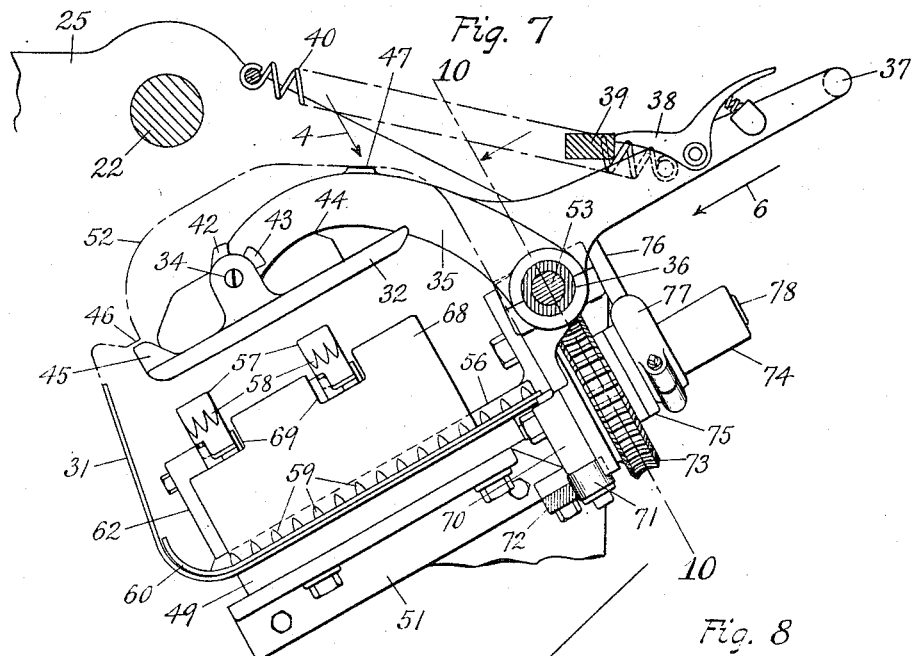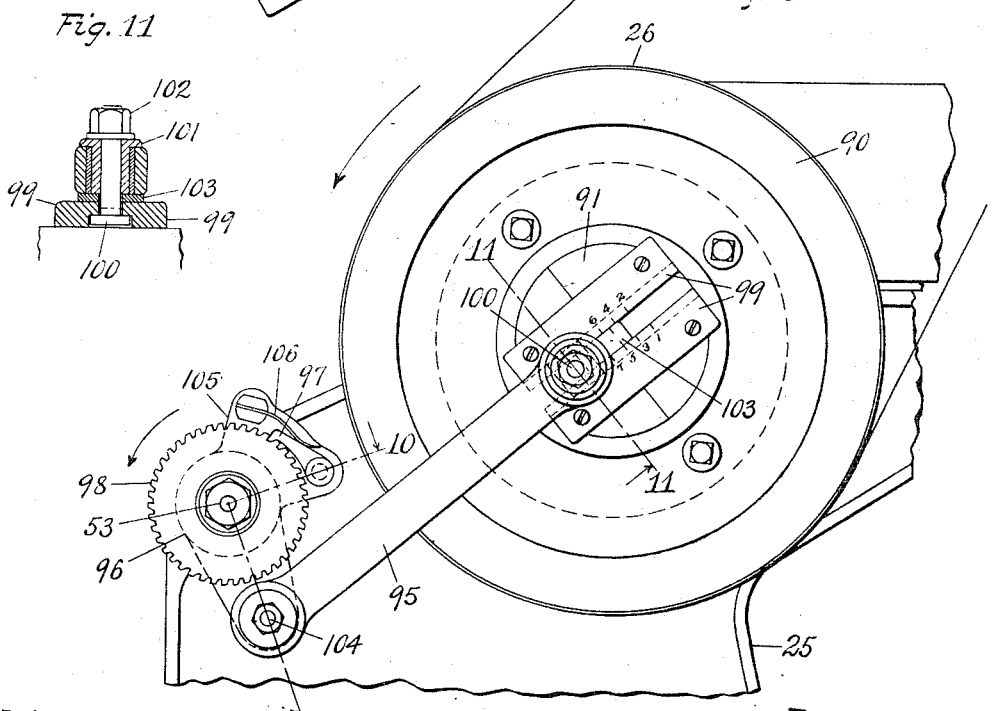

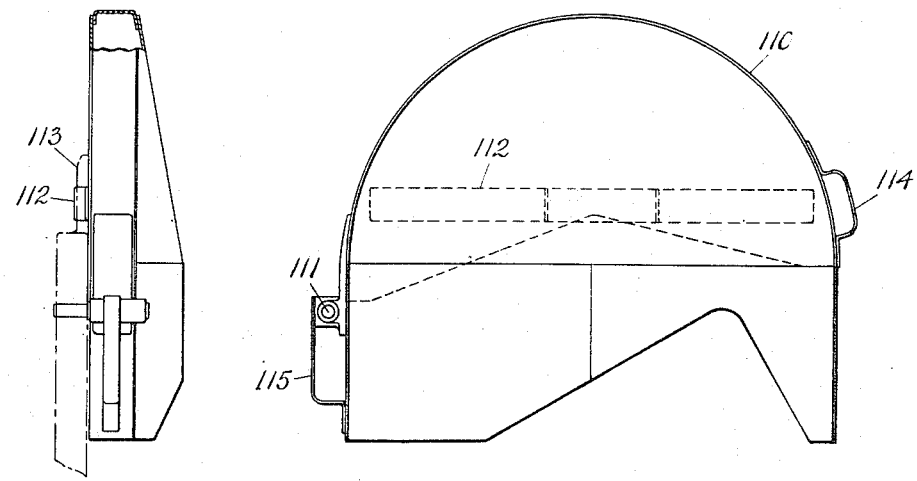

UNITED STATES PATENT OFFICE.

WILLIAM A. LORENZ, OF HARTFORD, CONNECTICUT, ASSIGNOR OF ONE-FOURTH TO SAID LORENZ AND ONE-FOURTH TO WILLIAM H. HONISS, OF HARTFORD, CONNECTICUT, AND ONE-HALF TO BEECH-NUT PACKING COMPANY, OF CANAJOHARIE, NEW YORK, A CORPORATION OF NEW YORK.

SLICING-MACHINE.

1,049,245.  Specification of Letters Patent.  Patented Dec. 31, 1912.

Application filed February 14, 1907. Serial No. 357,421.

*To all whom it may concern:*

Be it known that I, WILLIAM A. LORENZ, a citizen of the United States, and resident of Hartford, in the county of Hartford and State of Connecticut, have invented certain new and useful Improvements in Slicing-Machines, of which the following is a full, clear, and exact specification.

This invention relates to improved means for the rapid and accurate slicing of meat, ham, bacon and other materials, the object being to produce a rapid and powerful, yet accurate and easily controlled and operated machine for the commercial slicing of various shapes and sizes of the different cuts or pieces or sections of meat; and other materials upon which the machine is adapted to operate.

The embodiment of my invention herein shown and described is one which is adapted for the slicing of meat, and particularly of beef and bacon, which are brought to the machine in strips or slabs, more or less irregular and uneven in size and shape, and are stacked upon each other in the trough of the machine and pushed slowly along that trough by the feed mechanism of the machine, while a rapidly revolving knife, having a spiral edge cuts down through the face of the advancing piece or stack of pieces, and severs therefrom slices of uniform thickness, the slices falling regularly into a pan or tray which is moved about beneath the knife by the attendant so as to grade or assort the slices as they fall, without handling them.

Figure 1 is a left end view of the machine. Fig. 2 is a right end view and Fig. 3 a front view. Fig. 4 is an angular view of what is shown in Fig. 7, looking in the direction of the arrow 4. Fig. 5 is a plan view of the machine, with the front part of the top shelf broken off. Fig. 6 is a front view of what is shown in Fig. 7, looking in the direction of the arrow 6. Fig. 7 is an end view in section on line 7—7 of Fig. 6, showing the pressing down device. Fig. 8 is an end view in enlarged scale of the feed mechanism. Fig. 9 is a section on line 9—9 of Fig. 3. Fig. 10 is a section on line 10—10 of Fig. 7. Fig. 11 is a section on line 11—11 of Fig. 8. Fig. 12 is a view showing the meat-holding hooks in their lowest position, and Fig. 13 shows them thrown back, ready for a new supply of meat. Fig. 14 is an end view in section taken on line 14—14 of Fig. 6. Figs. 15 and 16 are rear and end views respectively of the knife guard.

The knife 20 for cutting the meat is bolted and doweled on a removable head 21, which is keyed to the shaft 22, and is provided with a counterbalance 23, which may also serve as a clamp for holding the knife to the head. The shaft 22 revolves in the main bracket 24 at the left end of the machine close to the knife, and the feed bracket 25 at the right end, and is driven by a pulley 26. As the meat is cut off the slices fall in a tray 27 which can be moved in all directions, so as to enable the slices to be graded in the tray, according to the size or quality as they fall from the knife, the main bracket overhanging the tray shelf so as to allow the full length or width of the tray to be moved under the knife. (Fig. 3.) The brackets 24 and 25 are bolted on a bed 28 which is supported by two legs 29 and 30.

The blocks or strips of meat or other material to be sliced are placed in the trough 31 and are held down close to the revolving knife by the presser 32, and are fed forward beneath the presser and beneath the knife by the carriage 54. The presser 32 adjusts itself automatically to the tops of the uneven pieces of meat by swinging on a stud 34 in the presser arm 35, and by the swinging movement of that arm on its pivot stud 36. The arm is provided with a handle 37 and a latch 38, which engages with a lug 39 on the main bracket, for holding the arm in its upper position while placing meat in the trough. When the latch 38 is released from the lug, the spring 40 secured to the frame 24, as shown in Figs. 1, 3 and 4, pulls the presser down on the meat. The entering side 41 of the presser is inclined upwardly as shown in Fig. 6, so as to allow the presser to ride easily over the irregularities of the meat. The presser 32 has a limited amount of swinging motion relative to the arm 35, being limited in one direction by the lug 42 on the presser colliding with the lug 43 on the presser arm, and in the other direction by the presser side 41 striking against the presser arm at 44. In raising the presser the lug 45 of the presser strikes against the nose 46 on the main bracket, so that when the presser is in its highest position, it will stand about parallel with the bottom of the trough as shown in Fig. 7, so as to give full opening for the placing of the strips of meat. The lug 47 on the presser arm acts as a stop for the arm itself, striking against the main bracket. At that time the latch 38 catches behind the lug 39 of the bracket, and the presser arm will be held in that position until again released.

The trough 31 is adjustably secured by means of straps 48 and 49 bolted to the bracket-like supports 50 and 51, which in turn are firmly bolted or otherwise permanently secured to the brackets 24 and 25. The holes for receiving the bolts which fasten the trough 31 to the bracket supports, are elongated, as shown in Fig. 6, so as to allow lengthwise adjustment of the trough relative to the knife. The left end of the trough extends through an opening 52 in the main bracket, and coöperates with the knife as a shear, the elongated holes in the bracket supports 50 and 51 enabling the trough to be adjusted, and readjusted from time to time, as the shearing edges wear away.

The feeding movement of the meat along the trough 31 toward the knife, is effected by means of the meat carriage 54, the feed screw 53 and the ratchet mechanism at the right hand end of the machine. The carriage 54 is for convenience, preferably made in two parts, comprising the screw support 55 and the feed slide 56 resting in the trough 31. The meat hooks 57 are provided with teeth 58 which are pressed into the meat and hold it down on a row of spurs 59, best shown in Fig. 6. These spurs are preferably riveted to a steel plate 60, which is bent up at its rear end to fit the trough, and secured to the feed slide 56. The meat hooks are pivoted on studs 61 in brackets 62, which are bolted on the feed slide 56. Figs. 12 and 13 show the meat hooks in their two extreme positions. The lugs 83 on brackets 62 act as stops for the hooks in both cases. The hooks are pressed into the meat by springs 63 attached at one end by swivels 64 on studs 65 in the meat hook arms 84. The other ends of the springs are attached to heads 66 on rods 67 carried by brackets 62. The heads 66 are adjustably secured to the rods, to enable the tension of the springs to be varied. As shown in Fig. 13 the spring also serves to hold its hook in its open position, while the supply of meat is placed or renewed, it being only necessary for the operator to swing the hook from one position to the other, without operating any bolts or latches. For some uses the spurs and hooks are supplemented by blocks 68 or 79 of different heights, especially when several pieces of meat are piled on each other, to keep them from shifting their position relative to each other and to the feed slide. This tends to greater uniformity in the slices. The higher blocks 68 may be cut away at 69 when required to clear the hooks, as shown in Fig. 7. The position of these blocks upon the feed slide and their relation to the hooks is shown in Figs. 5, 7, 12 and 13. Their forward sides abut against the rearward ends or edges of the pieces of meat and add greater positiveness to the feeding action, especially when a number of pieces are piled one upon the other so that the lower and upper hooks do not penetrate the middle pieces. The heights of these blocks should be adapted to the different heights to which the meat is to be piled up; and it will be found convenient to have several of these blocks of different heights to suit various requirements.

The feed screw slide 55 has an extension 70 which carries a stud and roller 71, bearing against a guide bar 72, which is fixed at its ends to brackets 50 and 51. This bracket prevents the slide 56 from swinging up away from the trough. The extension 70 also carries a fixed stud 78 upon which a worm gear 73 revolves freely. On the same stud is a nut 74 with a friction flange 75 bearing against the worm gear. This nut is turned by a handle lever 76 in a collar 77, which is clamped on the nut 74. By tightening the nut 74 against the worm gear, the latter becomes fixed relative to the stud 78 and serves as a nut for the feed screw 53, which meshes with the worm gear at all times, thus feeding the slide along the trough toward the knife.

The feed screw 53 is journaled in two bushings 80 and 81 in brackets 24 and 25, respectively. The bushing 80, which is fixed to bracket 24, extends inside of the bracket, and forms the bearing 36 for the presser arm 35; the end of the bushing serving also as a stop for the slide.

The machine may be driven in any convenient way, as by a belt from a countershaft to the pulley 26. That pulley is preferably made in two parts, the flange 90 and the hub 91. The flange is preferably made heavy, forming a flywheel to carry the knife through heavy cuts. The hub 91 is preferably split, and is keyed and clamped on the shaft 22.

The mechanism for advancing the screw 53 consists mainly of a connecting rod 95, rocker arm 96, pawl 97 and ratchet 98. On the pulley hub 91 are secured two straps 99 which form a T-shaped seat for the square head of the stud 100. This stud with its bushing 101 forms an adjustable crank pin for one end of the connecting rod, and after adjustment is held firmly to the straps by the nut 102. The bolt carries an index 103 with a zero mark. The straps 99 are marked from 1 to 7, inclusive. By setting the index zero mark of the index opposite, for instance 5, as shown in Fig. 8, the pawl 97 will turn the ratchet 98 five teeth, at each revolution of the crank pin. Different thicknesses of slices can thus be obtained by adjusting the stud 100. The other end of the connecting rod 95 is pivoted to the rocker arm 96 by the stud 104. The rocker arm, which turns on an extension of bushing 81, has a flange 105 carrying the pawl 97 and its spring 106. On account of the rapidity with which it is desired to operate the feed mechanism there is a tendency for the screw to overrun the amount of rotation sought to be determined by the adjustment of the crank pin 100. To overcome this tendency a friction device, shown in section in Fig. 10, may be employed. The flanged bushing 81 is fixed on the bracket 25, and adjacent to the flange of the bushing is a collar 85, keyed to the screw 53. A friction plate 86 lined with a leather washer 87 is attached to the bracket 25 by means of screws 88, which may be adjusted to give the required degree of frictional resistance to the rotations of the screw. Springs 89 are also preferably employed between the heads of the screws and the plate 86, to cushion the pressure and follow up the wear of the collar and the washer.

To protect the operator from being cut by the knife, and also guard the latter from injury, I preferably employ a shield or guard 110 hinged on a stud 111 and resting with the strap 112 on the top of the main bracket 24. This strap is riveted on the back of the guard to strengthen it, and is cut out at the center to fit the tongue 113 on the main bracket 24, to hold the guard firmly in place when it is down over the knife. For cleaning or removing the knife, the guard is swung on the pivot stud 111 out of the way, by means of the handle 114, until it rests against the stop 116, when it is held by gravity. Another handle 115 is also provided to facilitate removing the guard from the machine.

It is found convenient to have a shelf 120 on top of the machine to hold a supply of meat, from which shelf the meat is transferred to the trough as required.

The table 121, on which the tray 27 rests, is preferably made of sheet metal, and is supported on two extension brackets 122, secured to the bed 28. The metal is extended beyond the table surface and is depressed behind the table to form a gutter 123, in which the stray scraps of meat are wiped by the sliding action of the trays 27 out of their way, without allowing them to fall on the floor.

I claim as my invention:—

1. In a slicing machine, the combination of a slicing knife, a trough for supporting the material to be sliced, means for feeding the material along the trough toward the knife, a presser device yieldingly mounted for self-adjustment to the irregular surface of the material for pressing down the latter adjacent to the knife, a lever for operating the presser, and means adjacent to the lever for latching and releasing the said pressing device.

2. In a slicing machine, the combination of a slicing knife, a trough for supporting the material to be sliced, means for feeding the said material along the trough toward the knife, a pressing device including a presser mounted for swinging movement on an axis substantially parallel with the travel of the material mounted in operative relation to the trough for holding down the said material in the trough adjacent to the knife, a spring for yieldingly holding the presser against the said material, and means for latching said presser out of action in its raised position against the action of the said spring.

3. In a slicing machine, the combination with a slicing knife, and with means for supporting the material to be sliced, of a pressing device for holding down the material adjacent to the knife, including a pivotally mounted arm, a presser mounted upon the arm for swinging movement, stops for limiting the swing of the presser to maintain the latter in approximately parallel relation to the trough, and means for latching the pressing device out of operation.

4. In a slicing machine, the combination of a slicing knife, a trough for supporting the material to be sliced, and a carriage for advancing the material along the trough, provided with a hook for engaging with the said material, the said hook being mounted for swinging movement which enables it to be swung into and out of the material, spring operated means for pressing the hook into the material, and for yieldingly holding the hook in two positions, one of which is in engagement with the material, and the other out of engagement therewith.

5. In a slicing machine, the combination of a slicing knife, a trough for supporting the material to be sliced, and means for feeding the said material along the said trough, including a hook pivotally mounted to swing into and out of the material, and a spring device operatively connected with the hook to hold the hook in two positions, in and out of the material.

6. In a slicing machine, the combination of a slicing knife, a trough for supporting the material to be sliced, and means for feeding the said material along the trough, including a hook mounted for swinging movement into and out of the material, and a spring device having a cranked connection with the hook, whereby the latter in one position is drawn into the material by the spring, and when in another position is held away from the material by the said spring.

7. In a slicing machine, the combination of a slicing knife, a trough for supporting the material to be sliced, means for feeding the material along the trough, including a slide having spurs and a push block mounted thereon to engage the material, and spring pressed hooks for hooking into the material adjacent to the blocks, to maintain it in position relative to the slide.

8. In a slicing machine, the combination of a knife shaft mounted for rotation, a cutter head secured on said shaft to rotate therewith, an eccentric slicing knife, and unitary means for counter-balancing the eccentricity of the knife and for securing it upon the cutter head.

9. In a slicing machine, the combination of a knife shaft mounted for rotation, a slicing knife provided with a spiral cutting edge, and means for removably but securely attaching the knife to the shaft, including a cutter head and a clamp having their aggregated weight disposed so as to approximately counterbalance the knife for its intended rotative speed.

10. In a slicing machine, the combination of a knife shaft mounted for rotation, a cutter head secured to said shaft, a knife having a spiral cutting edge disposed at varying distances from the axis of revolution of the knife, and means for securing the knife to the cutter head, including a clamp, shaped with relation to the form of the knife to approximately counterbalance the latter during its revolutions.

Signed at Hartford, Conn., this 9th day of February, 1907.

WILLIAM A. LORENZ.

Witnesses:
JANETTE S. ELLSWORTH,
HANS MALLNER.